June 3, 1952  J. E. ROBERTS  2,599,128
FISH LURE
Filed March 21, 1950
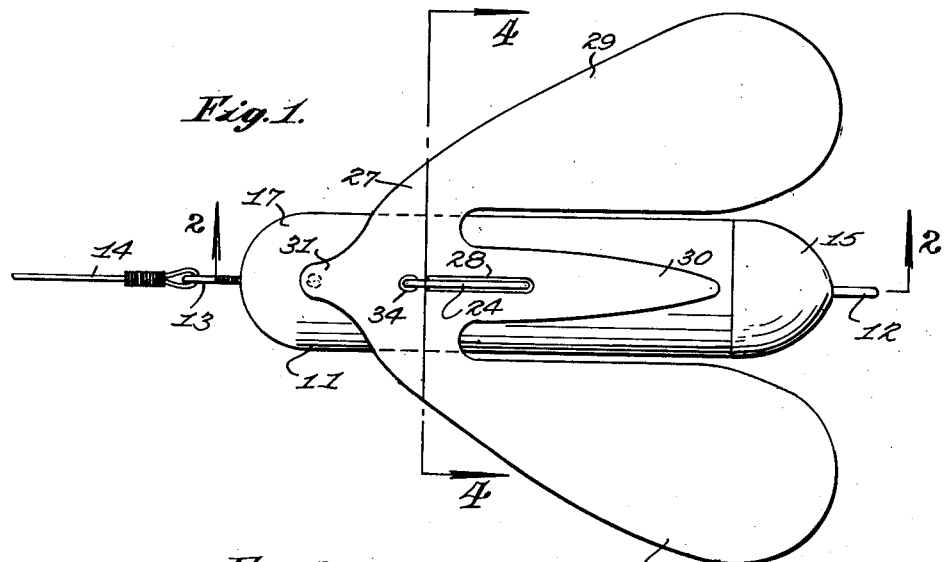
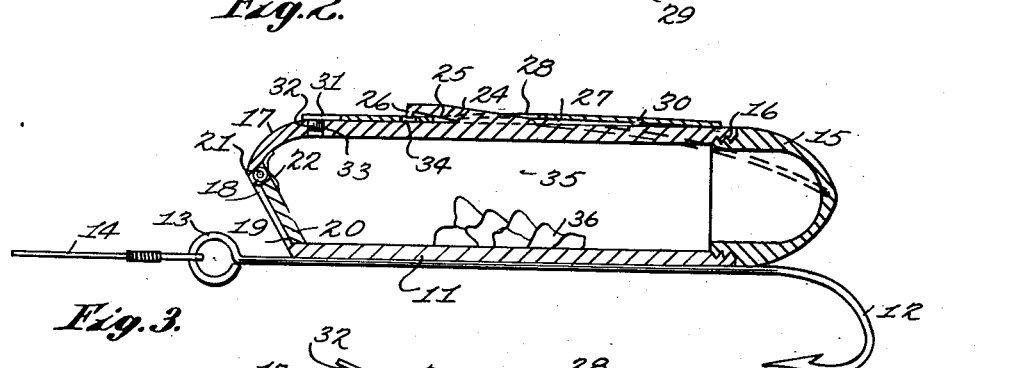
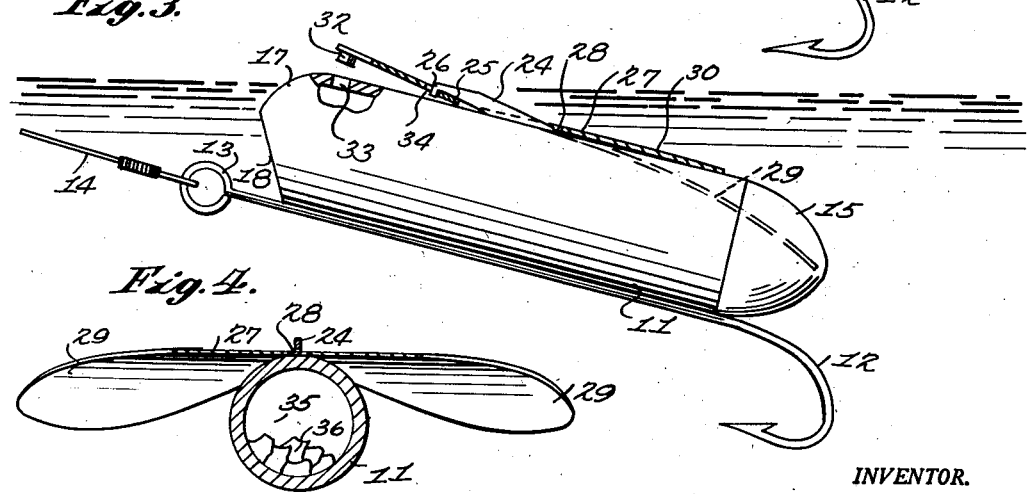
INVENTOR.
JESSE E. ROBERTS
BY
McMorrow, Berman & Davidson
ATTORNEYS Patented June 3, 1952

2,599,128

UNITED STATES PATENT OFFICE 2,599,128

FISH LURE

Jesse E. Roberts, St. Ignatius, Mont.

Application March 21, 1950, Serial No. 151,007

2 Claims. (Cl. 43—26.2)

This invention relates to artificial bait, and more particularly to means for effecting animation of the same.

An object of the invention is to provide an improved fish lure in which parts thereof representative of the movable parts of an insect or the like may be given movements to simulate actuation of wings.

Another object of the invention is to provide an improved fish lure in which parts thereof are representative of the movable parts of an insect or the like are operated by gas pressure actuated means.

Still another object of the invention is to provide a fish lure of the above type in which the gas under pressure for operating the wing structure is generated in the body of the device.

With these and other objects in view, the invention consists in the construction, arrangement and combination of elements of which it is composed, as will be hereinafter more fully described and claimed.

In the accompanying drawing:

Figure 1 is a plan view of a fish lure constructed according to the present invention;

Figure 2 is a vertical longitudinal section taken along the line 2—2 of Figure 1;

Figure 3 is a side elevation, partly in section, showing the wing structure in another position; and Figure 4 is a vertical transverse section taken along the line 4—4 of Figure 1.

Referring to the drawing, the fish lure comprises a hollow body 11 having a fishhook 12 affixed lengthwise thereof, as shown in Figures 2 and 3. The end of the fishhook opposite to the hook is formed with an eye 13 to provide means by which the device can be connected to a fish line 14.

The end of the body 11 adjacent the fishhook 12 is open to provide a filler opening for the body and is provided with a closure cap 15 which is detachably connected to the body by conventional screw-threads 16 formed on said body and said cap, respectively.

The opposite end 17 of the body 11 is also open and formed with an inwardly inclined wall 18 having an opening 19 formed therein, said opening being normally closed by a flap valve 20 pivotally mounted at 21 on the end 17 and retained in closed position by means of a leaf spring 22.

Upstanding from the exterior of the body 11 and arranged lengthwise thereof is a rib 24. The rib 24 is formed on the body a suitable distance to the rear of the end 17, and the forward portion of said rib is undercut, as indicated at 25, to provide an open space beneath a portion of the rib. The forward extremity of the portion of the rib 24 which is free of the body 11 is formed with a depending lug 26 to provide a depending hook.

A wing structure 27, formed from a sheet of flexible material, has an elongated slot 28 formed lengthwise thereof for receiving the rib 24. The wing structure 27 has wings 29 at the opposite sides thereof, said wings being located in spaced relation to the side wall of the body 11 and being connected at their forward ends to the main body of the structure 27.

Extending rearwardly of the portion of the structure 27 having the slot 28 formed therein is an elongated tailpiece 30 which bears against the body 11 in the manner shown in Figures 2 and 3.

Projecting forwardly of the main body of the wing structure 27 and arranged along the longitudinal center line thereof is tongue 31 having a lug 32 depending therefrom and normally mounted in an opening 33 formed in the wall of the body 11 to close said opening.

The portion of the body of the wing structure directly underlying the lug 26 of the rib 24 is formed with an opening 34 for receiving said lug.

The construction and arrangement of the parts is such that with the rib 24 disposed within the slot 28 and the lug 32 inserted in the opening 33 in the manner shown in Figure 2, the wing structure 27 will be retained in position on the body and will be free to move relative to said body.

In order to impart fluttering and other vibratory movements to the wing structure 27 so as to attract fish to the lure, suitable materials may be deposited within the chamber 35 of the body for producing gases. One material found suitable for such purpose is carbide, indicated at 36, Figure 2. When it is desired to charge the device, the cap 15 is unscrewed from the body 11 and a desired quantity of carbide 36 placed in chamber 35. Moisture supplied to the carbide will generate gas within the chamber and when the pressure of the gas exceeds a predetermined amount, the lug 32 will be forced outwardly of the opening 33 to position the lug 26 in opening 34. This action tips the wings 29 downwardly.

Due to the manner in which the tongue 31 is uplifted when the pressure of the gas within the chamber 35 acts on the lug 32, the body of the wing structure 27 directly to the rear of the tongue and constituting the tailpiece 30 will be flexed in such a way that the tailpiece is put under tension. Consequently, when the pressure of the gas within chamber 35 decreases a predetermined amount, the tailpiece 30 functions as a spring to return the tongue 31 to its normal position in which the opening 33 is closed by the lug 32. Thus, it will be noted that the lug 32 constitutes a relief valve which is actuated by a build up of gas pressure within the chamber 35 to open the opening 33 and thereby effect a reduction in such pressure.

During use of the device in water, the body 11 will be partly submerged in the water. Since the flap valve 20 is normally held seated against its seat around the opening 19 by the combined pressures of spring 22 and the gas within the chamber 25, as the pressure of the gas within chamber 35 drops in the manner heretofore described, the pressure of the water acting on the exposed face of the flap valve 20 swings said valve inwardly from its seat, thereby permitting water to enter the chamber 35 through opening 19. In the meantime the relief valve 32 has been actuated to close the opening 33, as has been described, so that gas pressure again builds up within chamber 35. When the valve 20 is in equilibrium, the spring 22 will act thereon to seat the valve, thereby closing opening 19. The carbide 36 will then generate gas pressure within the chamber 35, and the cycle of operation will be repeated to effect operation of the wing structure in the manner heretofore described.

While the foregoing specification sets forth the invention in specific terms, it is to be understood that numerous changes in the shape, and the method of attaching the various parts may be resorted to without departing from the spirit and scope of the invention as hereinafter claimed.

What is claimed is:

1. A fish lure comprising a hollow body having a filler opening at one end thereof and a restricted outlet opening spaced from said filler opening, a closure cap detachably secured to said body closing said filler opening, said body having a water inlet opening at its other end, a valve carried by said body in closing relationship to said inlet opening to admit water into said body through said inlet opening and preclude escape of fluid under pressure from the interior of said body through said inlet opening, a rib on said body providing a hook formation adjacent said outlet opening, a wing structure of sheet material and of substantially triangular shape having a slot therein receiving said rib, said wing structure being engaged under said hook formation to secure it to said body and having its apex portion in covering relationship to said outlet opening, and a valve element dependingly carried by the apex portion of said wing structure and resiliently held by said wing structure in closing relationship with said outlet opening, said hollow body being adapted to hold gas generating material to produce gas under pressure when exposed to water admitted through said inlet opening, the escape of which through said outlet opening and past said valve element imparts vibratory movement to said wing structure.

2. A fish lure comprising an elongated hollow body adapted to hold a gas generating material and having a restricted outlet opening for the escape of gas under pressure therefrom and an inlet opening for the entry of water therein, a valve carried by said body in closing relationship to said inlet opening to admit water into said body through said inlet opening and preclude escape of fluid under pressure from the interior of said body through said inlet opening, a rib on said body providing a hook formation adjacent said outlet opening, a wing structure of resilient sheet material having a slot therein receiving said rib and having at one end of said slot a tongue engaged by said hook formation and overlying said outlet opening and at the other end of said slot an elongated tail piece bearing at its distal end on said body at a location spaced beyond said hook formation from said outlet opening, said wing formation also having wings joined at corresponding ends to said tongue and extending along and spaced from said tail piece at respectively opposite sides of the latter, and a valve element carried by said tongue and said tail piece into closing relationship to said outlet opening to impart vibratory movement to said wing structure upon escape of gas under pressure through said outlet opening.

JESSE E. ROBERTS.

REFERENCES CITED

The following references are of record in the file of this patent:

UNITED STATES PATENTS

| Number | Name | Date |
|---|---|---|
| 726,020 | Bryan | Apr. 21, 1903 |
| 1,384,366 | Welch | July 12, 1921 |
| 1,906,791 | Grossmann | May 2, 1933 |
| 1,994,692 | Davenport | Mar. 19, 1935 |
| 2,120,151 | Miller | June 5, 1938 |
| 2,224,389 | Haselwood | Dec. 10, 1940 |
| 2,227,242 | Boutin | Dec. 31, 1940 |
| 2,534,639 | Twist | Dec. 19, 1950 |